United States Patent

Molnar et al.

[11] Patent Number: 5,397,368
[45] Date of Patent: * Mar. 14, 1995

[54] SPECIALTY SOD MATS CONSTRUCTED OF NONWOVEN FABRIC

[75] Inventors: Charles J. Molnar; Judith R. Molnar, both of 12 Malvern Ct., Devon, Wilmington, Del. 19810

[73] Assignees: Charles J. Molnar; Judith R. Molnar, Wilmington, Del.

[ * ] Notice: The portion of the term of this patent subsequent to Jul. 6, 2010 has been disclaimed.

[21] Appl. No.: 95,660

[22] Filed: Jul. 21, 1993

[51] Int. Cl.$^6$ .......................... A01G 7/00; A01C 1/04; A01C 1/00; A01B 79/00
[52] U.S. Cl. ............................................. 47/58; 47/9; 47/56; 47/1.01
[58] Field of Search .................... 47/1.01, 9, 9 C, 9 M, 47/9 P, 9 R, 9 S, 9 SC, 56, 58.25, 58; 156/60, 61

[56] References Cited

U.S. PATENT DOCUMENTS

| | | | |
|---|---|---|---|
| 3,516,196 | 6/1970 | Lippoldt | 47/56 |
| 3,557,491 | 1/1971 | Franklin et al. | 47/56 |
| 3,863,388 | 2/1975 | Loads | 47/56 |
| 3,890,739 | 6/1975 | Blackburn | 47/56 |
| 3,914,901 | 8/1975 | Muldner | 47/56 |
| 4,023,506 | 5/1977 | Robey | 111/1 |
| 4,336,668 | 6/1982 | Decker | 47/58 |
| 4,342,807 | 8/1982 | Rasen et al. | 428/180 |
| 4,539,038 | 9/1985 | Gombert | 71/64.11 |
| 4,584,790 | 4/1986 | Gaughen | 47/56 |
| 4,786,550 | 11/1988 | McFarland et al. | 428/203 |
| 4,934,094 | 6/1990 | Walton | 47/56 |
| 4,941,282 | 7/1990 | Milstein | 47/58 |
| 4,986,026 | 1/1991 | Decker et al. | 47/56 |
| 5,189,833 | 3/1993 | Clark | 47/56 |
| 5,224,290 | 7/1993 | Molnar et al. | 47/56 |
| 5,224,292 | 7/1993 | Anton | 47/64 |

OTHER PUBLICATIONS

Organic Gardening, Sep. Oct. 1990, pp. 47-49 by Jeff Cox "Something Wild".
Hort Science, 8(1), pp. 89-91, 1983 "Developing Wildflower Sods" by Airhart et al.
Hort Science, 12(5), pp. 492-494 (1977) "The Production of Ground Covers in a Sod-Like Manner" by Sterrett et al.
Proceedings of the International Propagators Society, vol. 25, 1975, pp. 408-412, "Ground Cover Sods..." by Sterrett et al.
Cooperative Extension Service, Univ of De, 1974 "Sod Production with Plastic Netting" by Mitchell et al.

Primary Examiner—David T. Fox
Assistant Examiner—Erich E. Veitenheimer

[57] ABSTRACT

New specialty sod mats are described. The sod mats use a nonwoven sod reinforcement of low strength to provide ease of handling, good sod mat propagation characteristics and easy dispersal into the soil by rototilling or other means when the mats are no longer useful as sods. Specialty sod mats of grasses, ornamental plants, and nutritional plants are disclosed. The method of propagation is disclosed.

35 Claims, 7 Drawing Sheets

SPECIALTY SOD MATS CONSTRUCTED OF NONWOVEN FABRIC

This invention relates to specialty sod mats reinforced with very low strength reinforcements which facilitate early harvest, ease of handling and ease of ultimate disposal.

BACKGROUND OF INVENTION

Reinforced sods have long been known in the art. Sod mats of groundcovers, flowers, and playing field grasses are among the examples.

Molnar (U.S. Pat. No. 5,224,290) discloses flower and groundcover sod mats reinforced with nylon sod reinforcements. Decker (U.S. Pat. No. 4,986,026) discloses tall fescue sod mats which are very large and employ planting mediums containing straw and sewage sludge. Molnar (Application #07/745224) discloses flower and groundcover sod mats reinforced with polypropylene sod reinforcements. Milstein (U.S. Pat. No. 4,941,282) discloses wildflower sod mats reinforced with polyester fabrics. McFarland (U.S. Pat. No. 4,786,550) discloses a lightweight seed mat formed with melt blown nonwovens. Walton (U.S. Pat. No. 4,934,094) discloses a grass sod reinforced with netting. Decker (U.S. Pat. No. 4,336,668) discloses a novel method of growing groundcover sods reinforced with synthetic netting. Muldner (U.S. Pat. No. 4,190,981) discloses a complex lightweight seed mat using complex expensive equipment. Airhart in HortScience 18(1), 89–91, 1983 discloses groundcover and flower sods reinforced with synthetic netting.

In general, sod mats reinforced with synthetic spunbond fabrics are excellent all purpose sod mats. They have very good sod mat production characteristics, good strength and are easy to handle. The current synthetic spunbond reinforced sod mats use the inherent strength of the synthetic fabric to reinforce them. This often results in higher synthetic resin consumption and other limitations discussed herein.

Sod mats employing natural reinforcements such as straw, bark, or water sensitive glues can decompose prematurely if harvest time is delayed or if the planting medium is particularly biologically active. Furthermore, the time at which degradation begins is difficult to control.

Sod mats employing synthetic netting for reinforcement can produce good sod mats. They do however, suffer from some important drawbacks. If the netting openings are large, harvest is usually delayed while if the netting openings are small, the roots of the plants can be girdled, Neither leads to sod mats with both optimum sod mat production and growing characteristics.

In view of the above prior art, there still exists a need for specialty sod mats which combine the advantages of early harvest time, good "shelf life" stability, and which are easy to handle and propagate. Improved control of degradation timing for at least some of the reinforcement is desired to improve "shelf life" stability of sod mats wherein a portion of the reinforcement is degradable. Furthermore, sod mats which place reduced demands on the strength of the synthetic reinforcement are needed to reduce synthetic resin consumption and in general, to reduce costs. Objects of the current invention are then to develop a select group of preferred specialty sod mats along with their method of manufacture which are easy to handle, have good "shelf life" stability, and place reduced demands on the strength of the synthetic reinforcement. Another object of the invention is to develop sod mats with improved control of degradation timing for a portion of the reinforcement to improve "shelf life" stability. It is also an object of this invention to develop a manufacturing process for these specialty sod mats with good production characteristics.

Other objects and advantages of the current invention will become more apparent to those skilled in the art in view of the following description and examples.

BRIEF DESCRIPTION OF DRAWING FIGURES

A brief description of the figures and reference numerals follows.

Reference Numerals in Drawings

Figure 1:
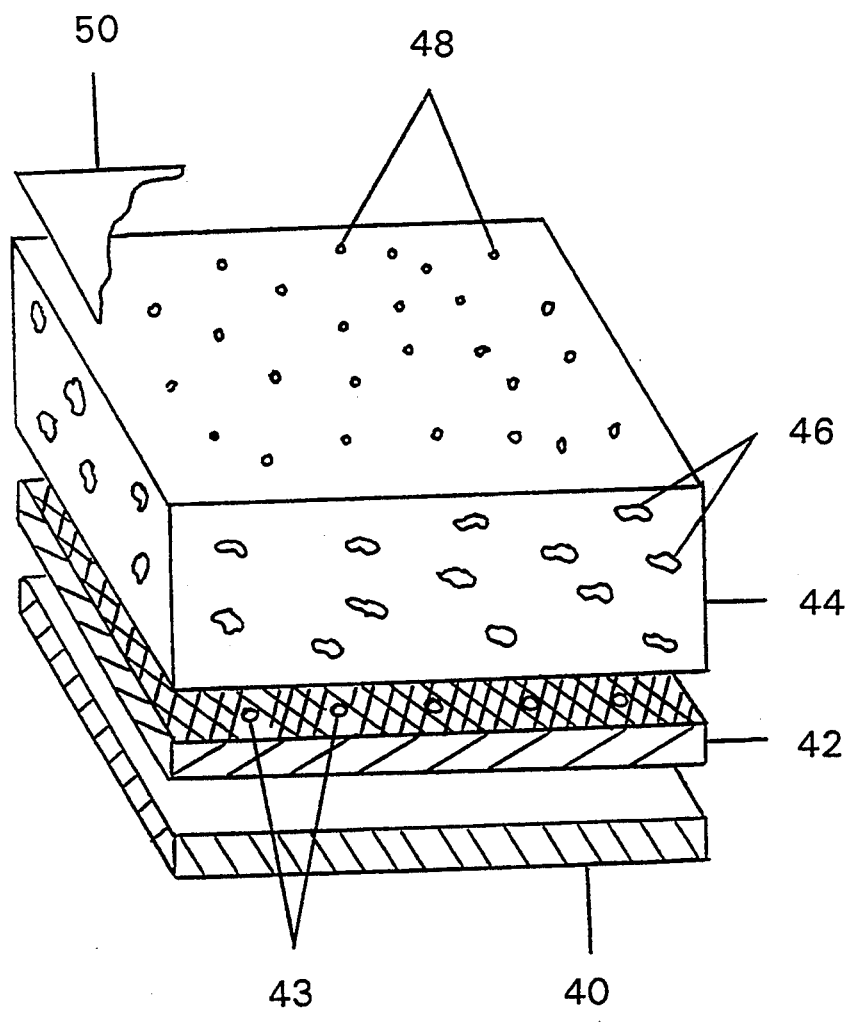
FIG. 1 is a simplified perspective view of a newly planted specialty sod mat.

40 Surface sod mat is growing on.
42 Nonwoven sod reinforcement
43 Apertures in the nonwoven sod reinforcement
44 Planting medium
46 Planting medium amendments such as wood chips, hay, straw, and the like.
48 Plant starting material
50 Crop cover
52 Mature plants ready for harvest
54 Mature plant roots
56 Mature plant roots penetrating the nonwoven sod reinforcement
58 Nonwoven sod reinforcement fibers
70 Prepare flat for planting.
72 Install nonwoven sod reinforcement.
74 Install planting medium. Add planting medium amendments as desired.
76 Add plant starting material.
78 Keep moist and add appropriate planting amendments. Allow to mature into a sod in 1–18 months.
80 Harvest.
82 Prepare field for weed guard and lay down plastic film.
84 Install bed edging.
100 Two hands lifting sod mat.
102 Transverse direction.
104 Machine direction.
106 Mature plants in harvested sod mat.
108 Mature specialty sod mat.
110 Two hands lifting nonwoven sod reinforcement, KIARA ® 4110.
112 Nonwoven sod reinforcement, KIARA ® 4110.
114 Duct tape taped to end of nonwoven sod reinforcement.

116 Lattice holding nonwoven sod reinforcement to two by four.
118 Screws holding lattice to two by four.
120 Wooden two by four.

SUMMARY OF INVENTION

Our invention is a new plant sod mat comprising a nonwoven sod reinforcement wherein said nonwoven sod reinforcement is a nonwoven fabric with an average grab tensile strength of less than or equal to about 5.5 lb and said nonwoven fabric has an Effective Fiber Count of from about 30 to 10000 per square centimeter and a layer of planting medium on said nonwoven sod reinforcement and containing viable plants growing in said planting medium and whose roots penetrate and entangle with said nonwoven fabric and thus, form a sod mat wherein said root penetration through said nonwoven fabric is greater than or equal to about 0.05 grams per 400 $cm^2$ of said sod mat. More preferably, our invention is a new plant sod mat as above wherein said nonwoven fabric has an average grab tensile strength of less than or equal to about 4 lb and even more preferably said nonwoven fabric has an average grab tensile strength of less than or equal to about 2 lb. Preferable sod mats of our invention have said root penetration through nonwoven fabric greater than 0.1 grams per 400 square centimeters. A preferable sod mat of this invention has said nonwoven fabric with an Effective Fiber Count of from about 50 to 5000 per square centimeter and even more preferably said Effective Fiber Count is from about 100 to 2500. Preferable sod mats of this invention have a Mutual Reinforcement Ratio greater than or equal to about 1.5 and even more preferred sod mats have said Mutual Reinforcement Ratio of greater than or equal to about 2. Preferable sod mats of this invention have said nonwoven sod reinforcements with a hydrohead of less than 40 cm.

Based on our instant invention, we have by figures, explanation, and example shown how to effectively select and grow these specialty sod mats to specific customer needs.

DESCRIPTION OF PREFERRED EMBODIMENTS—FIGS. 1-3

Sod mats of this invention are often referred to as specialty sod mats in this specification. FIG. 1 is a fragmentary cross section of a typical specialty sod mat according to this invention. A specialty sod mat of this invention is a plant sod mat which is reinforced with a nonwoven sod reinforcement wherein the nonwoven sod reinforcement is a nonwoven fabric with an average grab tensile strength of less than or equal to about 5.5 lb and a Effective Fiber Count of from 30 to 10000 per square centimeter of said nonwoven fabric. Reference Numeral 40 is a suitable surface on which to grow sod mats such as a heavy (e.g. 6 rail) black polyethylene film. Other surfaces such as plywood, heavy perforated plastic film, rubber sheets, or concrete may also be used. In a field grown application, the sod growing surface prevents weeds from growing into and through the sod mat from below and also encourages the plant roots to grow laterally and entangle with the low strength sod reinforcement and thus, form a sod mat. In a flat grown application, the bottom of the flat normally serves as the sod mat growing surface. Good drainage in the flat is important. Reference Numeral 42 is the nonwoven sod reinforcement. The nonwoven sod reinforcement comprises a nonwoven fabric with an average grab tensile strength of less than or equal to about 5.5 pounds and an Effective Fiber Count of from about 30 to 10000. Reference Numeral 43 represents apertures which facilitate good water infiltration. Reference 44 is the planting medium. The planting medium is adjusted to the optimum depth for the particular plant species. For specialty sod mats of this invention, generally low density planting mediums are employed such as REDI-EARTH ® manufactured by W. R. Grace or FAIR-GROW ® manufactured by Delaware Solid Waste Authority of Wilmington, Del. Municipal Solid Waste (MSW) is also an effective planting medium. Composted waste products are particularly useful because of their general low cost and light weight. Further examples of suitable planting mediums are disclosed in U.S. Pat. Nos. 4,720,935 by Rogers et. al., U.S. Pat. No. 4,934,094 by Walton, U.S. Pat. No. 4,941,282 by Milstein, and U.S. Pat. No. 4,986,026 by Decker and are included by reference. Soil can also be used effectively. Light weight planting mediums are particularly preferable and have a dry volume density below 700 grams per liter dry weight and more preferably below 500 grams per liter dry weight. Planting mediums with a dry volume density of above 150 grams per liter dry weight are preferred. Examples of planting medium amendments are represented by Reference Numeral 46 and include fertilizers, lime, hydrogels, PERLITE ®, wood chips, hay, straw, and the like and are well known in the art. Reference Numeral 48 represents the plant starting materials. Representative plant starting materials include seeds, seedlings, plant plugs, rooted cuttings, root divisions, cuttings, and viable plant materials derived from plant tissue cultures and the like. Seedlings, rooted cuttings and the like are spaced according to the particular plant species but normally are spaced on a 5 to 20 cm grid pattern. Reference Numeral 50 represents an optional crop cover which can aid early germination and give some protection from marauding birds.

Figure 2:
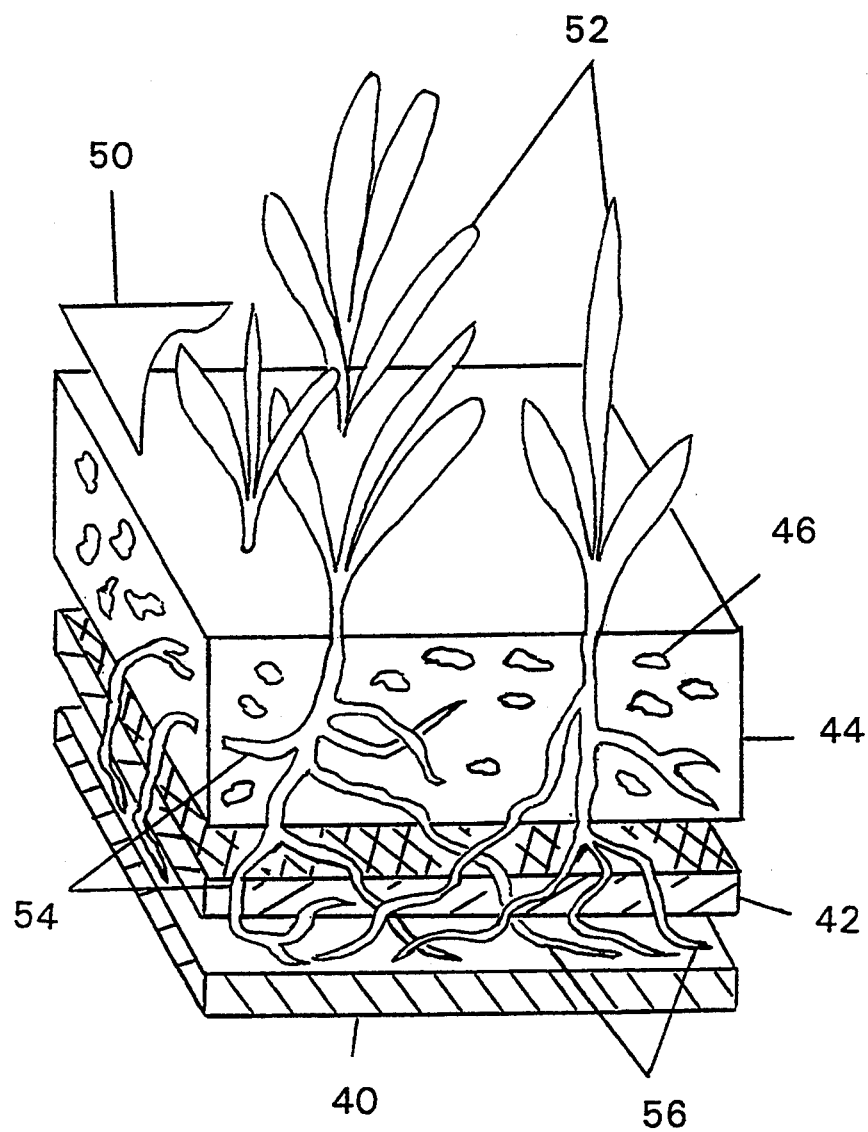
FIG. 2 is a simplified perspective view of a specialty sod mat ready for harvest.

FIG. 2 is a fragmentary cross section of a mature specialty sod mat according to this invention. Reference 40 is a suitable surface on which to grow sod mats. Reference Numeral 42 is a nonwoven sod reinforcement. Reference Numeral 44 is the planting medium. Reference Numeral 50 represents optional crop covers such hay or well known nonwoven fabric crop covers to give some over wintering protection. Reference Numeral 52 depicts the mature plants ready for harvest. A preferred class of plants is nutritional plants which is comprised of herbs and vegetables. Representative examples of nutritional sod mats include sods of thyme and cherry tomatoes. Another preferred class of plants is ornamental plants which is comprised of flowers and groundcovers. Representative ornamental plant examples include bedding plants, liriope spicata, ivy, cosmos, and hostas. A particularly preferred class of plants is garden plants which consists of nutritional and ornamental plants. Another preferred class of plants is grasses. Specialty grasses is a preferred class of grasses which is comprised of bunch grasses and shade grasses. Representative examples of bunch grasses are perennial rye grass and tall fescue grass. Reference Numeral 54 depicts the roots of the mature plants ready for harvest penetrating and entangled with each other and the nonwoven sod reinforcement. Reference Numeral 56 are the plant roots which penetrate the nonwoven sod reinforcement. This root penetration and entanglement is mutually reinforcing to both the plant roots and the reinforcement and makes these very low strength sod reinforcements so useful and advantageous as will be discussed below.

Figure 3:
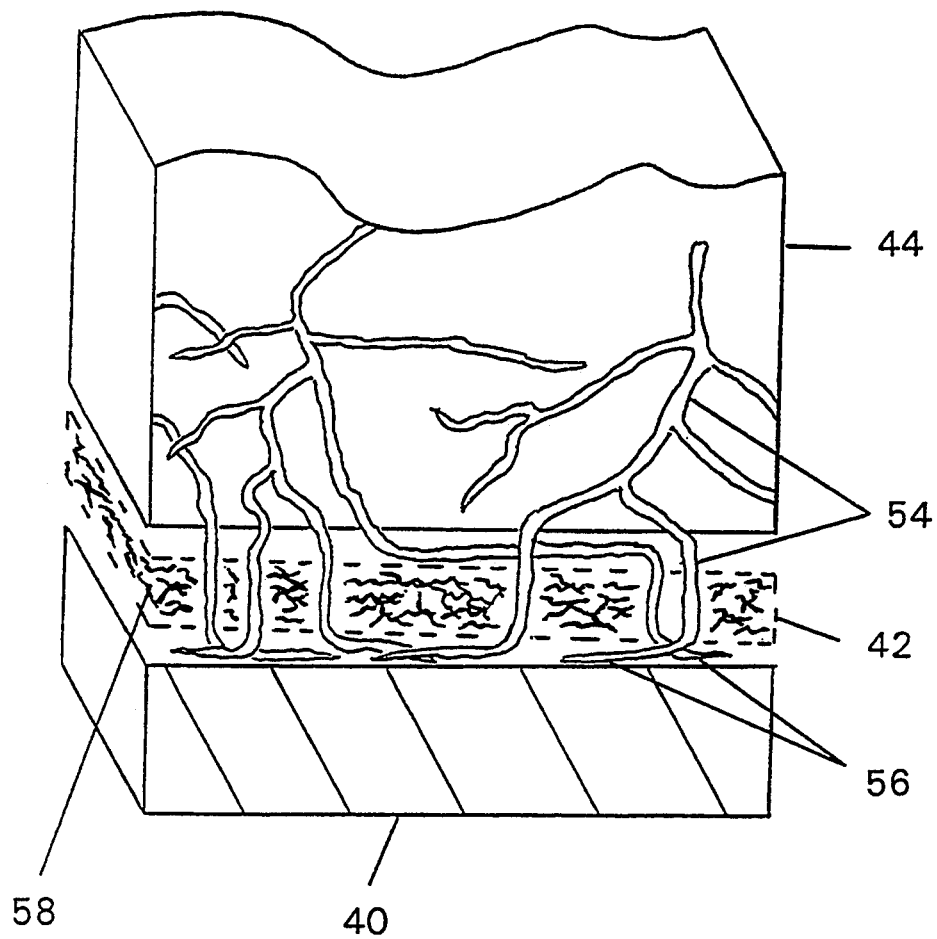
FIG. 3 is an artist's conception of the important root penetration in a specialty sod mat.

FIG. 3 is an artist's expanded view of a mature specialty sod mat according to this invention to better show some of the key characteristics. Reference Numeral 40 represents the sod mat growing surface. Reference Numeral 44 represents the planting medium. Reference Numeral 54 represents the plant roots of the sod ready for harvest which bind the planting medium to the nonwoven sod reinforcement. Reference Numeral 42 is the nonwoven sod reinforcement. Reference Numeral 56 are the plant roots which penetrate the nonwoven sod reinforcement. Reference Numeral 58 are the fibers of the nonwoven sod reinforcement.

It has long been recognized that sod mats which promote earlier harvest times are needed in the industry. In addition, there is a need for sod mats which place lower strength demands on the synthetic nonwoven reinforcement while maintaining good "shelf life" stability and ease of handling characteristics. We have found that new and useful sod mats may be grown with heretofore unheard of low strength sod reinforcements by producing sod mats which unexpectedly combine the strength of the synthetic reinforcement with the plant roots to form sod mats. These new sod mats meet many unmet needs in the marketplace. These sod mats are produced with nonwoven sod reinforcements and garden plants by combining the strength of garden plant roots and the nonwoven sod reinforcement in a new, novel, and valuable combination. In this instant invention, a nonwoven sod reinforcement with an effective amount of plant root penetration through the nonwoven sod reinforcement is used to produce these new sod mats. The nonwoven sod reinforcements of this invention comprise nonwoven fabrics with particular grab tensile strengths and Effective Fiber Count per square centimeter. As the grab tensile strength of the nonwoven sod reinforcement decreases, the plant root fibers become increasingly important in reinforcing the sod mat. This makes heretofore unheard of low grab tensile strength sod reinforcements useful in producing sod mats with viable plants when employed according to the teachings of this instant invention. Examples of sod mats with strengths much higher than the nonwoven sod reinforcement could be expected to support and much higher than the equivalent plant roots without reinforcement could support are demonstrated below. In fact, the sod mat reinforcements demonstrated herein for viable plant sod mats employ lower strength synthetic reinforcements than many lightweight seed mats and yet they retain very good handling characteristics. We believe this is because viable plant sod mats of this invention are reinforced by both the synthetic reinforcement and the plant roots. Actual examples are included below demonstrating these surprising results (For instance, see Example 4 and Comparative Example 12 below). From a comparison of Example 4 and Comparative Example 12, the root entanglement with the nonwoven fabric promotes not only good handling characteristics and surprising Mutual Reinforcement Ratios, but it promotes early harvest of garden sod mats. Thus, one skilled in the art will recognize that not only does one benefit from reduced propagation times and improved handling, but the grower also benefits by using lower grab tensile strength nonwoven sod reinforcements (and often lower fabric basis weights) than heretofore used for garden sod mats. Thus even though the specialty sod mats of this invention are substantially heavier on a per unit area of viable plant sod mat because they contain a moist, relatively heavy planting medium layer than comparable light weight seed mats (which contain no moist, heavy planting medium layer), specialty sod mats often use lower strength nonwoven reinforcements and yet retain good handling characteristics because of the additional plant root reinforcement.

By combining the strength of the plant roots and the nonwoven sod reinforcement we have discovered that additional surprising and valuable benefits heretofore unknown in nonwoven fabric reinforced sod mats are possible. By propagating the sod mats in a way which effectively uses both the strength of the plant roots and the nonwoven sod reinforcements we have found that "shelf life" stability is very good. Heretofore, sod mats with biodegradable reinforcements which start to degrade only when desired and then which degrade quickly were unknown in the art. By using the biodegradable plant root structure to actively help reinforce the sod mats, while the plants are alive, the biodegradable root reinforcement not only remains strong but also gains strength through aging by normal growth and increased entanglement with the nonwoven sod reinforcement. It is only when the sod mat plants are killed by rototilling or other selected means that the biodegradation of the roots begin. After the plant sod mat has served its purpose and it is time to disperse the sod mat in the garden soil, the sod mat may be rototilled or otherwise dispersed in the garden soil with a minimum of effort because of the low grab tensile strength of the nonwoven sod reinforcement. Furthermore, after the sod mat has been rototilled under, the plant roots which reinforced the sod mat rot. This, of course, further weakens any remaining sod clumps containing reinforcement, and thus facilitates dispersion of these remaining sod clumps into the garden soil. For this reason specialty sod mats, which are reinforced with very low amounts of fibrous synthetic fabrics, are garden friendly. By tapping the root structure for increased strength, the synthetic resin consumption and strength requirements of the nonwoven sod reinforcements is reduced. This lowers the cost to society and the propagator while increasing garden friendliness. In summary, sod mats of this invention combine nonwoven fabrics with particular grab tensile strengths and Effective Fiber Count to facilitate particular plant root penetration and entanglement to produce the garden friendly, versatile sod mats of this instant invention.

We have discovered that nonwoven sod reinforcements can be used to produce good specialty sod mats wherein the nonwoven sod reinforcement comprises a nonwoven fabric with particular grab tensile strength characteristics. Nonwoven sod reinforcements comprising nonwoven fabrics with a grab tensile strength of less than or equal to about 5.5 pounds are preferable. More preferable are nonwoven fabrics with a grab tensile strength of less than or equal to about 4 pounds. Even more preferable are nonwoven fabrics with a grab tensile strength of less than or equal to about 3 pounds. Most preferable are nonwoven fabrics with a grab tensile strength of less than or equal to about 2 pounds. Preferable nonwoven fabrics have a grab tensile strength of greater than or equal to about 0.05 pounds and more preferably nonwoven fabrics have a grab tensile strength of greater than or equal to about 0.1 pounds and even more preferably nonwoven fabrics have a grab tensile strength of greater than or equal to about 0.2 pounds. It is understood by those of ordinary skill in the art that grab tensile strengths for nonwoven fabrics are normally measured in both the machine and the transverse directions. Nonwoven sod reinforcements wherein both the machine direction and transverse direction grab tensile strengths are within about 5.5 to 0.05 lb are preferred. Especially preferred are nonwoven sod reinforcements wherein both the machine direction and transverse direction grab tensile strengths fall within the limitations of the particular claim. A nonwoven fabric with a grab tensile strength in at least one direction of from about 1 to 0.05 lb is preferred for garden sod mat applications and a nonwoven fabric with a grab tensile strength in at least one direction of from about 0.5 to 0.2 lb is more preferred for some garden sod applications.

We have discovered that nonwoven sod reinforcements wherein the nonwoven sod reinforcement is a nonwoven fabric with a particular average grab tensile strength also make good specialty sod mats of this invention. For clarity, the average of the machine direction grab tensile strength and the transverse direction grab tensile strength is often referred to in this specification as the average grab tensile strength. For example, using the Fiberweb nonwoven fabric CEREX ® type 29 with a basis weight of 0.3 opsy contained in Table 2, the CEREX ® nonwoven fabric has a machine direction grab tensile strength of 4.3 lb and a transverse direction grab tensile strength of 2.0 lb and average grab tensile strength of 3.15 lb. Nonwoven sod reinforcements can be used to produce good specialty sod mats wherein the nonwoven sod reinforcement comprises a nonwoven fabric wherein the nonwoven fabric has an average grab tensile strength of less than or equal to about 5.5 pounds. More preferable are nonwoven fabrics with an average grab tensile strength of less than or equal to about 4 pounds. Even more preferable are nonwoven fabrics with an average grab tensile strength of less than or equal to about 3 pounds. Most preferable are nonwoven fabrics with an average grab tensile strength of less than or equal to about 2 pounds. Preferable nonwoven fabrics have an average grab tensile strength of greater than or equal to about 0.1 pounds and more preferably nonwoven fabrics have an average grab tensile strength of greater than or equal to about 0.2 pounds and even more preferably nonwoven fabrics have an average grab tensile strength of greater than or equal to about 0.4 pounds.

Sod reinforcements of this instant invention develop good, early root penetration through and entanglement with the nonwoven sod reinforcement to develop into a useful sod mat. Mutual reinforcement between the plant roots and the nonwoven sod reinforcement fibers is developed during propagation. Surprisingly, sod mats which are heavier than the nonwoven sod reinforcement by itself can support or the plants by themselves can support are produced using this instant invention (as shown in many of the examples). The mutual reinforcement is currently believed to be due to the excellent root entanglement with themselves and the nonwoven sod reinforcement which distributes the stresses more evenly across to the nonwoven sod reinforcement and the plant roots and in general, aids in the reinforcement of the sod mats of this invention. Important to this excellent entanglement is having a large number of nonwoven sod reinforcement fibers per unit area of the sod mat for the roots to penetrate and entangle with. We have found that nonwoven fabric with particular Effective Fiber Counts per unit area of nonwoven fabric promote excellent early root penetration and entanglement and thus are preferred for nonwoven sod reinforcements. For purposes of this specification, the nonwoven fabric Effective Fiber Count (EFC) per unit area of nonwoven fabric is calculated using the following equation:

$$\frac{EFC}{\text{Area of Nonwoven Fabric (cm}^2\text{)}} = \frac{\text{Basis Weight (gpsm)} \times (9{,}000 \text{ m})}{\text{Denier (dtex)} \times 110}$$

Examples of Effective Fiber Counts per square centimeter of nonwoven fabric are included in the following Table 1.

| Product | Fabric Basis Weight (gpsm) | Fiber Denier (dtex) | Effective Fiber Count per area of nonwoven fabric (#/cm²) |
|---|---|---|---|
| ENPP 0105 | 4 | 0.3 | 1100 |
| ENPP 0177 | 10 | 0.3 | 2700 |
| ENPP 0108 | 17 | 0.3 | 4600 |
| ENNY 0239 | 13.5 | 0.3 | 3700 |
| CEREX ® Type 29 (0.3 opsy) | 10 | 3.8 | 210 |
| CELESTRA ® 0.5 opsy | 17 | 3 | 460 |
| KIARA ® 4110 | 8 | 3.3 | 200 |

The Effective Fiber Count per square centimeter of nonwoven fabric are preferably greater than or equal to about 30 per cm², and more preferably greater than about 50 per cm² and even more preferably greater than about 100 per cm² and most preferably greater than about 150 per cm². The Effective Fiber Count per square centimeter of nonwoven fabric is preferably less than about 10000 per cm² and more preferably less than about 5000 per cm² and even more preferably less than about 500 per cm² and most preferably less than about 1500 per cm². The preferred Effective Fiber Count per square centimeter of nonwoven fabric is influenced by parameters such as the ease of root wetting, ease of water transport to the roots, ease of tearing and rototilling, and fiber size or denier. By experience we have found the following ranges of Effective Fiber Count to be very useful for nonwoven fabrics within the indicated fiber denier ranges. For nonwovens with fiber deniers of from about 2 dtex to 6 dtex, Effective Fiber Count per square centimeter of nonwoven fabric is preferably from about 30 to 1500 per cm² and more preferably from about 30 to 1000 per cm² and even more preferably from 50 to 300 per cm². For nonwoven fabrics with fiber deniers of from about 0.1 dtex to 2 dtex, Effective Fiber Count per square centimeter of non woven fabric is preferably from about 200 to 5000 per cm² and more preferably from about 200 to 2500 per cm² and even more preferably from about 200 to 1500 per cm². A particularly preferable general range of Effective Fiber Count per square centimeter of nonwoven fabric is from about 50 to 5000 per cm² and more preferably from 50 to 2500 per cm² and even more preferably from about 100 to 1000 per cm².

As discussed above, it is particularly important to have good plant root penetration and entanglement with the nonwoven sod reinforcements to propagate sod mats with good handling characteristics. This root penetration and entanglement of the nonwoven fabrics creates mutual reinforcement of the nonwoven sod reinforcement with the roots and visa versa. Root penetration is measured by the following process:

1). A representative section of sod mat is chosen for measurement—usually about 20 centimeters by 20 centimeters.
2). The roots penetrating through the bottom of the reinforcement are carefully shaved off with a sharp instrument such as a single edge razor and carefully added to a clean 2 liter beaker.
3). The shaved roots are then carefully washed with tap water by mixing and screening out the shaved roots and placing them in a separate clean 2 liter beaker.
4). Steps 2) and 3) are repeated four times (or until the roots are visually clean) to remove the dirt and nonroot foreign matter. The clean washed roots are then transferred to a pre-weighed lightweight aluminum weighing dish.
5). The washed roots in the pre-weighed dish are then dried for 8 hours at 110 degrees centigrade in a ventilated, temperature controlled oven.
6). The root penetration is then calculated as follows (20 cm by 20 cm sod mat):

| | |
|---|---|
| Gross weight (dried roots plus dish) | 5.53 g |
| Tare weight of aluminum dish | 5.42 g |
| | 0.11 g per 400 cm$^2$ of sodmat |

An added benefit of these sod mats unrealized in the art is when the specialty sod mats have served their useful purpose and are then rototilled or otherwise dispersed in the soil, the sod mats easily tear because of their low strength, whereupon the root reinforcement rots and thus, further facilitates easy dispersion of the spent nonwoven sod reinforcement in the soil. By numerous experiments, we have determined that a root penetration of greater than or equal to about 0.05 grams per 400 square centimeters of sod mat are preferred and more preferable are root penetrations of greater than or equal to about 0.1 grams per 400 square centimeters of sod mat and even more preferable are root penetrations of 0.2 grams per 400 square centimeters of sod mat. To promote early harvest, sod mats with root penetration of less than or equal to about 10 grams per 400 square centimeters of sod mat are preferred and more preferable are sod mats with less than or equal to about 5 grams per 400 square centimeters of sod mat.

Nonwoven sod reinforcements are not generally limited to particular types of nonwoven fabrics. Nonwoven fabrics are broadly defined as nonwoven web structures made by mechanically, thermally or chemically bonding or entangling thermoplastic fibers. The amount of fiber bonding and/or fiber entanglement can effectively be varied over a broad range. The fibers can be continuous or discrete lengths or mixtures thereof. When practiced according to the guidance of this instant invention by those of ordinary skill in the art, all common types of nonwoven fabric can be utilized effectively. Preferred nonwoven fabrics comprise melt blown nonwovens, spunbond nonwovens, hydroentangled nonwovens and carded nonwoven webs and fabrics. Nonwoven fabrics produced with the dry carded process generally use cut staple fiber bonded together using usual art-known bonding techniques such as adhesive binders, heated calendar rolls, hot air, sonic, laser, pressure bonding needle punch and the like. Chemically bonded nonwoven fabrics generally use latex binders. The staple length fibers offer many advantages to these types of nonwoven sod reinforcements such as sod mat versatility and good propagation characteristics. Carded nonwoven webs may also be used as an effective sod reinforcement. Hydroentangled, melt blown, and spunbonded nonwovens are especially preferred types of nonwoven sod reinforcements. Both point and area bonded nonwoven fabrics as well as point and area entangled nonwoven fabrics are very good nonwoven sod reinforcements.

Although the examples below are carried out with polypropylene, polyester and nylon nonwoven fabrics, it will be understood that the invention is not limited thereto and that other thermoplastic polymers capable of making nonwoven fabrics are to be included. The chemistry of nonwoven sod reinforcement comprises preferably polyolefin or nylon. Polyolefins such as polyethylene and polypropylene are particularly preferred because of their low cost, degradability, and broad availability. Linear low density polyethylene is a particularly preferred polyethylene. Other preferred polyethylenes are copolymers of polyethylene and higher alpha-olefins having 4 to 18 carbon atoms. Nylons such as nylon 6 or nylon 66 are particularly preferred for excellent water infiltration, root wetting, degradability, and general versatility. Other particularly useful nonwoven fabric chemistries comprise polyesters, acrylics, and polyurethanes. Copolymers and polymer blends of the preferred chemistries are, of course, included in their respective chemical types. It is also often desirable to incorporate in the nonwoven fabric other materials as fibers (e.g. cotton, rayon, or wood) and super absorbents which promote water infiltration, moisture retention and moisture transfer to the roots particularly in melt blown, hydroentangled and drybonded nonwoven sod reinforcements. Very low strength nonwoven fabrics can be effectively reinforced with degradable fibers, such as cotton or rayon, during manufacture or alternately supported during manufacture on degradable carrier sheets. The technology to produce these nonwoven s is well documented in the open art. A particularly well known reference is the Kirk-Othmer Encyclopedia of Chemical Technology published by John Wiley and Sons, London/New York, Vol. 16, 3rd Edition, 1978, pages 72–124. Some examples of nonwoven processes well known in the art include U.S. Pat. Nos. 5,151,320 to Homonoff et al., U.S. Pat. No. 5,108,820 to Kaneko et al., U.S. Pat. No. 5,068,141 to Kubo et al., U.S. Pat. No. 4,997,611 to Hartman, U.S. Pat. No. 4,970,104 to Radwanski, U.S. Pat. No. 4,931,355 to Radwanski, U.S. Pat. No. 4,925,601 to Vogt et. al., U.S. Pat. No. 4,902,559 to Eschwey, U.S. Pat. No. 4,857,065 to Seal, U.S. Pat. No. 4,755,178 to Insley, U.S. Pat. No. 4,451,315 to Miyazaki, U.S. Pat. No. 4,100,324 to Anderson, U.S. Pat. No. 3,978,185 to Buntin et al, and U.S. Pat. No. 3,454,519 to Hulse and are included herein by reference. These references are not meant to limit nonwoven fabrics useful in this invention, but only to serve as helpful guidance to those skilled in the art. Nonwoven fabrics useful in this invention are also available commercially from companies such as Ergon in Jackson, Miss., Kimberly-Clark in Neenab, Wis., Fiberweb North America, Inc. in Greenville, S.C., and Johnson & Johnson Advanced Materials Co. in New Brunswick, N.J. Table 2 below shows some typical nonwoven sod reinforcements.

TABLE 2

Some Typical Nonwoven Sod Reinforcements and Nominal Physical Properties

| Product | Grab Tensile Strength MD (lb) | Grab Tensile Strength TD (lb) | Fiber Size (dtex) | Air Permeability (cfm/ft$^2$) |
|---|---|---|---|---|
| ENPP 0105 | 0.8 | 1.0 | 0.3 | 547 |
| ENPP 0177 | 1.5 | 1.8 | 0.3 | 370 |
| ENPP 0108 | 5.2 | 4.6 | 0.3 | 106 |
| ENNY 0239 | 2.6 | 2.4 | 0.3 | 323 |
| CEREX ® Type 29 (0.3 opsy) | 4.3 | 2.0 | 3.8 | >1100 |
| CELESTRA ® 0.5 opsy | 2.8 | 2.1 | 3 | 950 |
| KIARA ® 4110 | 1.8 | 0.25 | 3.3 | >1100 |

MD = machine direction
TD = transverse direction
Grab tensile strength: Test Method ASTM D-1682-64
Air permeability: Test Method ASTM D-737-75 at 0.5 inch of water.
ENPP and ENNY are melt blown nonwoven fabrics manufactured by Ergon.
CEREX ® and CELESTRA ® are spunbond nonwoven fabrics manufactured by Fiberweb North America.
KIARA ® is a spunbond nonwoven fabrics manufactured by Johnson & Johnson Advanced Materials Co..

As stated above, when the specialty sod mats have served their useful purpose and are then rototilled or otherwise dispersed in the soil, the sod mats easily tear because of their low strength, whereupon the root reinforcement rots and thus, further facilitates easy dispersion of the nonwoven sod reinforcement in the soil. This mutual reinforcement of the roots with the nonwoven sod reinforcement can be calculated using the measurement techniques disclosed in some of the attached examples along with the equation below. A Mutual Reinforcement Ratio (MRR) of the nonwoven sod reinforcement can be calculated by dividing the weight of a useful sod mat with planting medium and root penetration and entanglement by the weight that the nonwoven sod reinforcement will not support and which causes tearing (with no root reinforcement). Using Example 4 contained herein, the Mutual Reinforcement Ratio of the nonwoven sod reinforcement is calculated in the following manner:

$$\text{Mutual Reinforcement Ratio} = \frac{2856 \text{ grams } (SGW)}{1200 \text{ grams } (TW \text{ of } NSR)}$$

where:

SGW = Gross Sod Weight in grams which can be lifted in grams.

TW of NSR = Tearing Weight of Nonwoven Sod Reinforcement in grams.

The Mutual Reinforcement Ratio is preferably run in triplicate for sods of similar characteristics. Similar sod mat characteristics include similar root penetration (plus or minus approximately 20%), the same nonwoven sod reinforcements (with same grab tensile strength and Effective Fiber Count), same plants, and planting rates. Similar propagation conditions are also used. The determination of the Mutual Reinforcement Ratio may require some ordinary experimentation. For example, some experimentation may be necessary to determine a reasonable sod mat weight to propagate for the particular nonwoven sod reinforcement used under the similar conditions discussed above. Using the disclosures herein, one of ordinary skill in the art and using ordinary experimentation can determine the Mutual Reinforcement Ratio for sod mats grown with nonwoven sod reinforcements. Mutual Reinforcement Ratios of greater than about 1.5 are preferable and Mutual Reinforcement Ratios of greater than or equal to about 2 are especially preferred. Further details are included in Example 4.

Specialty sods of this invention are very easy to handle and promote nonwoven sod reinforcement fiber entanglement with the plant roots. We have discovered in this instant invention that small diameter or light weight fibers (and weaker fibers) in the sod reinforcement facilitate the tearing of the fibers by the root penetration, minimize root breakage with hand subdivisions and also aid in easy dispersion of the sod reinforcement in the soil after use. Fiber weight is measured in denier. Denier in dtex is by definition: "the mass in grams of a fiber 9,000 m long". It can be calculated with the following formula:

$$\text{Denier (dtex)} = \frac{\text{Fiber Mass (g)}}{\text{Fiber length (m)}} \times 9{,}000 \text{ m}$$

The determination of denier is well known to those skilled in the art. Nonwoven sod reinforcement comprised of fibers of less than or equal to about 6 dtex are preferred and more preferably are fibers of less than or equal to about 3 dtex and even more preferably are fibers of less than or equal to about 2 denier and most preferably are fibers of less than or equal to about 1 dtex. Nonwoven sod reinforcements comprised of fibers of greater than or equal to about 0.1 dtex are also preferred and more preferably are fibers of greater than or equal to about 0.2 dtex. Nonwoven fabrics comprised of fibers from about 0.1 to 6 dtex are preferable and more preferable are nonwoven fabrics comprised of fibers from about 0.1 to 3 dtex and even more preferable are nonwoven fabrics comprised of fibers from about 0.2 to 2 dtex.

It is well known in the art that nonwoven fabrics can be manufactured with generally anisotropic or isotropic physical properties such as grab tensile strength. In isotropic nonwoven fabrics the grab tensile strength in the machine direction and in the transverse direction are very similar. In anisotropic nonwoven fabrics the grab tensile strength in the machine direction and in the transverse direction are very different. Generally, nonwoven fabrics with isotropic grab tensile strengths are preferred for specialty sod mat reinforcements. For the purposes of this specification, nonwoven fabrics are considered isotropic if the ratio of the machine direction grab tensile strength to the transverse direction grab tensile strength is from about 2/1 to 1/2. For unique applications, anisotropic nonwoven fabrics can be preferred and offer some very unusual and surprising sod mat performance characteristics. For the purposes of this specification, nonwoven fabrics are considered anisotropic if the ratio of the machine direction grab tensile strength to the transverse direction grab tensile strength is greater than about 2/1 or less than about 1/2. The range of ratios of the machine direction grab tensile strength to transverse direction grab tensile strength for anisotropic nonwoven fabrics is from 25/1 to 2/1 or from 1/2 to 1/25. By producing sod mats with nonwoven sod reinforcements with anisotropic nonwoven fabrics containing a weak direction, the sod mat can often be easily dispersed into the soil after use. Example 4 demonstrates how this may be used in actual practice.

As discussed earlier, sod mats of this invention can be designed to be easily dispersed in the garden soil when their useful life is past. As the nonwoven fabric grab tensile strength decreases, the sod mats become easier to disperse. Nonwoven fabric tensile strength is affected by a number factors such as chemistry, nonwoven fabric structure, and fabric basis weight and degree of bonding or entanglement. These factors are well known to those skilled in the art. The weight percent of the nonwoven sod reinforcement in the specialty sod mat affects the amount of the nonwoven fabric which must be dispersed or mixed into the soil and thus can also impact dispersal. The weight percent of the nonwoven sod reinforcement is preferably less than 0.5% by weight of the gross weight of the sod mat and more preferably less than 0.3% by weight of the gross weight of the sod mat and even more preferably less than 0.1% by weight of the gross weight of the sod mat. The weight percent of the nonwoven sod reinforcement is preferably greater than 0.01% by weight and even more preferably greater than 0.03% by weight of the gross sod mat. In order to keep the amount of synthetic nonwoven sod reinforcement low, nonwoven fabrics with relatively low basis weights are generally preferred. The nonwoven fabric basis weight is usually measured in ounces per square yard (opsy) or grams per square meter (gpsm). A nonwoven fabric with a basis weight of less than or equal to about 3 opsy is preferred and a nonwoven fabric with a basis weight of less than or equal to about 0.5 opsy is more preferred and a nonwoven fabric with a basis weight of less than or equal to about 0.4 opsy is even more preferred and a nonwoven fabric with a basis weight of less than or equal to about 0.3 opsy is most preferred. A nonwoven fabric with a basis weight of greater than or equal to about 0.02 opsy is preferred and even more preferable is a nonwoven fabric with a basis weight of greater than or equal to about 0.06 opsy and even more preferred is a nonwoven fabric with a basis weight of greater than or equal to about 0.1 opsy. A nonwoven fabric basis weight of from about 0.4 to 0.1 opsy is currently efficient to manufacture and is often preferred. We expect these preferred basis weights to drop in the future.

It is also to be understood that many nonwoven fabrics containing cellulosic or other degradable reinforcing fibers which have unused grab tensile strength above the preferred range can produce very useful specialty sod mats with the advantages of this instant invention. Illustrative examples of degradable fibers are rayon, cotton or wood but are not limited thereto. These degradable fibers decompose during the normal propagation period but the remaining nondegradable synthetic fibers retain the "good shelf life" stability, early harvest time advantages, and easy handling characteristics of the specialty sod mats. For purposes of claim interpretation, if a nonwoven fabric contains biologically decomposable fibers or adhesives, then it is normally tested by the well known soil burial test ASTM D 2020 Method B for a set period of time. A testing period of 120 days is preferred and a testing period of 180 is more preferred. After this exposure the nonwoven fabric is rinsed, allowed to dry out for 7 days at 23° C. The grab tensile strength is then determined by ASTM D-1682-64. A second method is referred to as the Field Trial Degradation Test in this specification. In the Field Trial Degradation Test, the nonwoven fabric is placed on black polyethylene film, covered with 2.5 cm of FAIRGROW ® and kept moist and exposed to outdoor weather for 10 months (spring, summer & fall). After this field exposure the nonwoven fabric is rinsed and allowed to dry out for 7 days at 23° C. The grab tensile strength is then determined by ASTM D-1682-64. If the nonwoven fabric contains hydrolytically unstable fibers or adhesives, then the nonwoven fabric is to be soaked in water for 60 days at 23° C., and then allowed to dry out at 23° C. for 7 days before testing the grab tensile strength. The grab tensile strength is then determined by ASTM D-1682-64. After these exposures and using the ASTM test results, the nonwoven fabrics are evaluated to determine if they fall within the claims of this invention. The Effective Fiber Count for nonwoven fabrics with degradable fibers is determined for the nondegradable fibers, such as nylon, polypropylene or polyester fibers, in the nonwoven fabric. Adding cellulosic fibers and the like make the nonwoven sod reinforcements tougher and easier to handle during installation, generally improve water infiltration because of their hydrophilicity and the cellulosic additives easily decompose to facilitate root penetration and entanglement. In some cases, the addition of degradable fibers also improves the ease of manufacture for some low strength nonwoven fabrics. For nonwoven sod reinforcements which contain these degradable fibers to improve nonwoven fabric handling, water infiltration, or ease of manufacture, and the like, preferable nonwoven fabrics contain from about 80% to 1% by weight of the degradable fibers and more preferably from about 70% to 2% by weight of the degradable fibers and even more preferably from about 50% to 2% by weight of the degradable fibers.

Nonwoven fabrics with large pores have good water infiltration and in general, good sod mat production characteristics. Nonwovens with especially fine diameter or low denier fibers have as a consequence of the low denier fibers, very fine pore structure. This very fine pore structure in some cases reduces water infiltration, root wetting, and even root penetration. The air permeability test is a general measure of porosity useful as a guide in selecting preferable nonwoven sod reinforcements. Air permeability is measured in this specification by ASTM D-73775 at 0.5 inches of water. Air permeability of from 300 to 1400 cfm/sf (cfm/sf=cubic feet per minute/square foot) is preferred and more preferable is an air permeability of from 400 to 1400 cfm/sf and even more preferable is an air permeability of from 500 to 1500 cfm/sf. Methods of manufacturing nonwovens with increased air permeability are well known in the art. Based on current extrapolations, nonwoven fabrics with air permeability of 1600 cfm/sf and above can be used for nonwoven sod reinforcements.

Specialty sod mat reinforcements must promote easy root wetting for propagation and to facilitate the transplanting and growth by the landscaper or enduse consumer. Good root wetting can be accomplished in a number of preferred ways for specialty sod mats of this invention. Examples include choosing the fiber base chemistry to facilitate easy water penetration in the nonwoven sod mat reinforcement such as using Nylon 6 or Nylon 66. If polyolefin nonwoven sod reinforcements are used, then known hydrophilic treatments to the nonwoven fabric or fiber may be used. Examples include plasma treatments, surfactants, and rewet agents. Examples of hydrophilic treatments known in the art include U.S. Pat. No. 5,045,387 to Schmaltz, U.S. Pat. No. 5,033,172 to Harrington, U.S. Pat. No. 4,753,843 to Cook, U.S. Pat. No. 4,753,834 to Braun, U.S. Pat. No. 4,743 to Komatsu, application Ser. No. 07/745224 by Molnar et al, and U.S. Pat. No. 4,578,414 to Sawyer and are herein included by reference. Still another method is to use heavy fibers in a lightweight fabric to increase pore size. Still another method is to incorporate bulking fibers to increase the porosity and thus, water infiltration. Suitable bulking fibers are usually crimped fibers of between about 2 and 15 cm long and more preferably from about 7 to 10 cm long and are stiffer than the general fibers in the nonwoven fabric in which they are used.

An especially preferred method to improve water infiltration and excellent root wetting is to use nonwoven reinforcements with apertures. Apertures may be designed into the manufacture of the nonwoven reinforcement or added by post modification. The preferred apertures are greater than or equal to about 0.015 cm in diameter and more preferably greater than or equal to about 0.02 cm in diameter and even more preferably greater than or equal to about 0.03 cm in diameter. The preferred apertures are normally less than or equal to 0.4 cm in diameter and more preferably less than or equal to about 0.25 cm in diameter and even more preferably less than or equal to 0.15 inches in diameter. Preferred apertures are round, oval, diamond or rectangular shaped. The diameter is defined as the maximum distance across the aperture opening. Apertures preferably cover less than or equal to 40% of the surface area of the nonwoven and more preferably cover less than or equal to about 25% of the surface area of the nonwoven and even more preferably cover less than or equal to about 15% of the surface area of the nonwoven. At the same time the apertures normally cover greater than or equal to about 0.1% of the nonwoven surface area and more preferably greater than or equal to about 0.3% of the nonwoven surface area and even more preferably greater than or equal to about 1% of the nonwoven surface area. Nonwoven fabrics with apertures in a repeating and uniform pattern are preferred for ease of manufacture. Apertures are preferably spaced within 2 cm of each other and more preferably within 1 cm of each other. Inclusion of apertures helps to assure good water infiltration and uniform root wetting. For nutritional sod mats and some sod mats containing edible flowers, use of apertures alleviates concern that any hydrophilic treatment can leach out of the nonwoven fabric and into the edible plant. Use of apertures also improves the water infiltration in some of the lower cost nonwoven sod reinforcements such as those based on polyolefin chemistry. A method of manufacturing apertures in nonwoven fabrics is to use hot needling where the nonwoven fabric is passed under reciprocating needles or needles on rollers, the needles being heated to about the melting temperature of the nonwoven fabric. This and other technologies to produce apertures are well known in the art. Some illustrative examples include U.S. Pat. No. 4886,632 to Van Iten et at., U.S. Pat. No. 4,588,630 by Shimalia, and U.S. Pat. No. 4,469,734 by Minto and are included by reference.

Through careful observation and experimentation, it has been found that the Hydrostatic Head Test AATCC Test Method 127-1977 is a particularly useful method to aid in screening nonwoven fabrics for good water infiltration and root wetting characteristics. The Test Method 127-1977 measures the hydrohead which is necessary to push water through a nonwoven fabric. As the hydrohead becomes lower or smaller, water penetrates a nonwoven fabric easier. The ease of water penetration is, of course, important to good root wetting and good sod mat propagation characteristics. Nonwoven sod reinforcements with a hydrohead of less than about 60 cm are preferable and more preferable is a hydrohead of less than about 40 cm and even more preferable is a hydrohead of less than 20 cm and most preferable is a hydrohead of less than about 10 cm. Nonwoven fabrics with a hydrohead of about 0 has excellent wetting and are thus very useful. A preferable hydrohead range is from about 0.1 cm to 40 cm and more preferably hydrohead range is from about 0.1 cm to about 20 cm and even more preferably the hydrohead is from 0.1 cm to 15 cm.

Thus using the instant invention, specialty sod mats of grasses, nutritional plants and ornamental plants are easily and cost effectively propagated. The resulting sod mats have excellent shelf life stability, are easy to hand subdivide, and have improved control of the timing of the degradation of the reinforcement over prior art sod mats. In addition, these sod mats place reduced demands on the strength of the synthetic nonwoven reinforcement and thus allow reduced consumption of synthetic material for these reinforcements. These characteristics make them particularly preferable sod mats for garden plants. Preferably apertures are used in nonwoven sod reinforcements which would benefit from improved water infiltration or uniform root wetting when growing sod mats of nutritional or edible plants instead of using hydrophilic treatments. Thus any potential leaching of the hydrophilic treatment will not be absorbed in the nutritional or edible plants. Nonwoven sod reinforcements based on polyolefin chemistry are particularly preferred for their low cost and versatility. Nonwoven sod reinforcements based on nylon chemistry are particularly preferred for their natural hydrophilic properties, in applications where apertures are not feasible for some reason, and for their good versatility.

Figure 4:
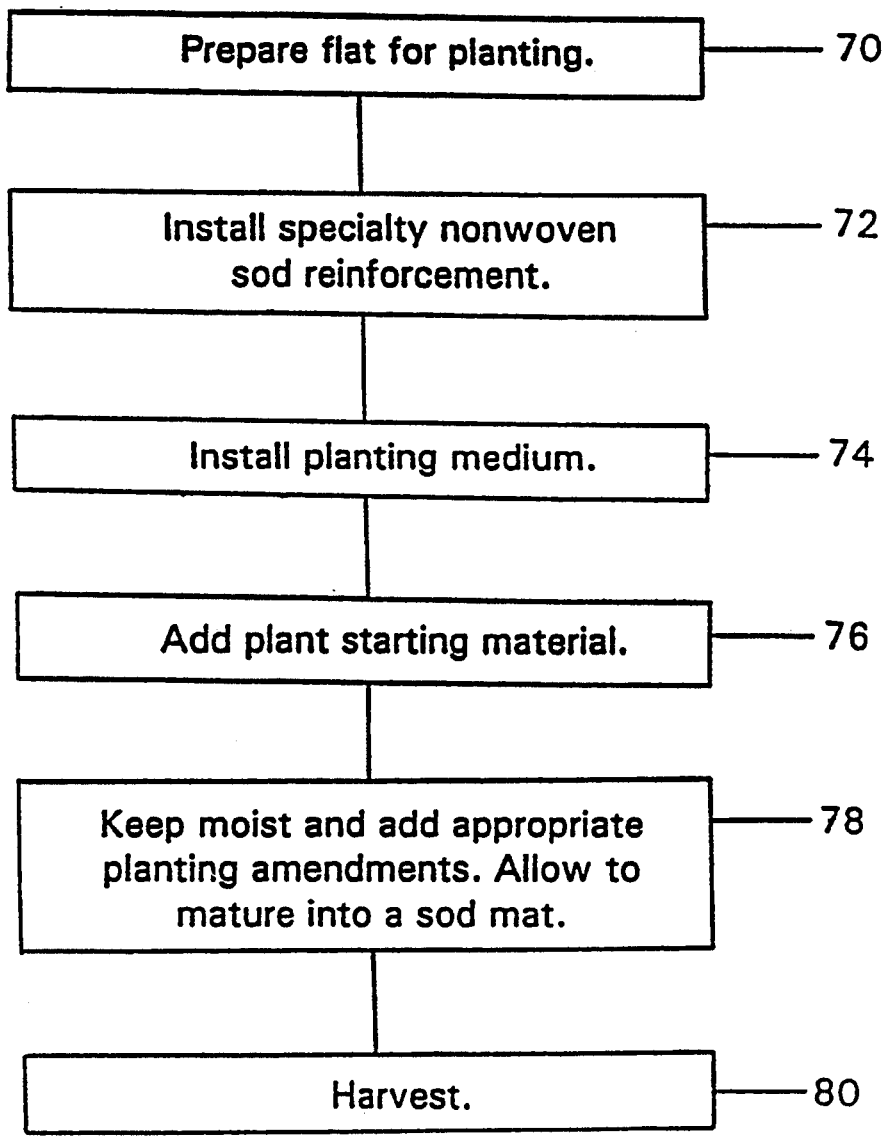
FIG. 4 is a block diagram illustrating the normal container process of the invention.
Figure 5:
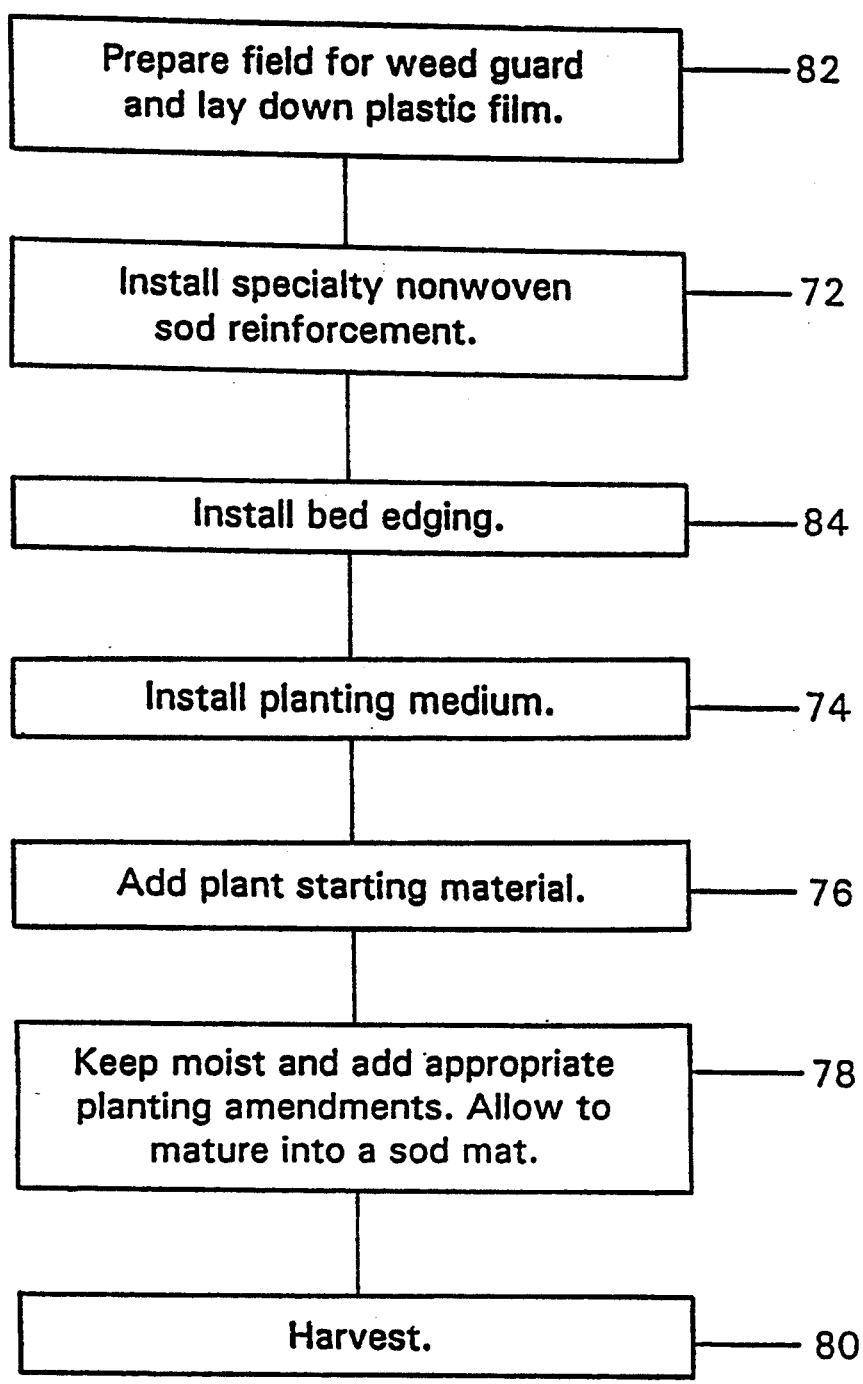
FIG. 5 is a block diagram of a typical field process of the invention.

Process Description (FIGS. 4 and 5)

In FIG. 4, there is shown a block diagram illustrating the general process for growing small specialty sod mats according to this invention. The six generalized steps are: (1) the step 70 of selecting the appropriate flat or container for growing the specialty sod mats of this invention. Generally the flat is from 5–10 cm deep, about 20–40 cm wide and about 20–70 cm long. Size is selected based on normal considerations of one of ordinary skill in the art such as preferred size by end-use customer, optimum depth of the planting medium for the target plant species, availability, and cost. A flat with drain holes is normally preferred. The bottom of the flat usually serves as Reference Numeral 40—the sod mat growing surface. A perforated polyethylene film is helpful for some types of flats. Step (2) the step 72 consists of installing the nonwoven sod reinforcement (Reference Numeral 42) on the bottom of the flat (Reference Numeral 40). (3) step 74 consists of selecting and installing the planting medium (Reference Numeral 44) to the optimum depth for the target plant species. Planting medium amendments may be added such as hay, vermiculite and the like as desired at this step. Drenching can also be useful at times. (4) step 76 consists of adding the plant species starting material (Reference Numeral 48) to the planting medium. (5) step 78 consists of normal feeding and care of the sod mat plant species such as watering, drenching, fertilizing, proper level of sunshine or shade, soil amendments, and the like during propagation. (6) step 80 consists of harvesting the sod. One can sell the sod with the flat or remove the specialty sod mat and sell it without the flat.

FIG. 5 is a block diagram illustrating the general process of growing specialty sod mats in the field according to this invention. The seven general steps are: (1) step 82 consists of preparing the field beds by filling the soil, removing any major weeds left, and then grade and smooth out. Lay down a plastic weed guard such as 6 mil black polyethylene film (Reference Numeral 40). Rows 4–8 feet wide by 100–200 feet are generally used. Aisles generally 3 feet wide are left between the rows for easy access. Common geotextiles are used between the rows to reduce weeds. Herbicides may also be used as desired to reduce weeds. (2) in step 72 the nonwoven sod reinforcement (Reference Numeral 42) is laid down on top of the black polyethylene film (Reference Numeral 40). (3) step 84 consists of installing appropriate bed railing such as 4″ by 4″ rot resistant treated lumber on the edges of the beds to contain the planting medium (Reference Numeral 44). Optionally, 1″ by 2″ rot resistant lumber may also be used to further subdivide the bed into smaller individual plots. (4) step 74 consists of selecting the preferred planting depth for the selected plants and adding the planting medium. Preferred planting medium amendments may also be added here. Drenching can also be useful at times. (5) step 76 consists of adding the target plant starting materials to the planting medium. (6) step 78 consists of normal feeding and care of the plants including such items as watering, drenching, appropriate light level control, planting medium amendments, and the like. If desired for environmental control reasons, common crop covers may be used to help warm the planting medium in the spring or for some protection from marauding birds. Hay or crop covers may be used to help to over winter the specialty sods. Allow sod to mature for 1–18 months. (7) step 80 consists of harvesting the specialty sod mats. The sod mats are generally harvested in sizes from 20–100 cm wide to about 20–300 cm long.

While some of the preferred embodiments of the instant invention have been discussed, it is understood that the invention is not limited to these, but is susceptible of numerous changes and modifications as are known to those of ordinary skill in the art using ordinary experimentation. One of ordinary skill in the art can use the embodiments of this instant invention with ordinary experimentation to develop preferred specialty sod mats with nonwoven sod reinforcements. It is to be understood that the particular nonwoven sod reinforcement grab tensile strength claim limitations and Effective Fiber Count claim limitations and plant root penetration claim limitations are important to realize benefits of this instant invention for new, specialty sod mats. It is also to be understood that the mutual reinforcement of the plant roots which penetrate the nonwoven sod reinforcement with themselves and the nonwoven sod reinforcement often plays an important roll in the good sod mat production, handling, and disposal characteristics. Those skilled in the art will recognize that different plants have different natural propensities for forming a strong entangled root structure, that propagation conditions will influence this root structure and that the nonwoven sod reinforcement will also influence root penetration and entanglement. Generally ox-eye daisy root structure is greater than plains coreopsis root structure and this is greater than sweet woodruff root structure. Using the teachings of this specification, good specialty sod mats of each of these plants can easily be grown as demonstrated in the examples below. Using the guidance and teachings of this specification along with ordinary experimentation, specialty sod mats are easily grown with good sod mat production characteristics, that are easy to handle, that have good "shelf life" stability, and which place reduced demands on the strength of the synthetic nonwoven reinforcement.

EXAMPLES

The following examples will further aid and help to guide those of ordinary skill in the art to practice the invention. It is understood that the invention is not limited thereto, but is susceptible of numerous changes and modifications by those of ordinary skill in the art.

Example 1

Using the sod mat propagation technique illustrated in FIG. 4, a flat was prepared containing about 20 cups of HYPONEX ® ALL PURPOSE POTTING SOIL and using Ergon ENNY 0239 melt blown nylon with a basis weight of 0.4 opsy as the nonwoven sod reinforcement. Approximately 1.5 gms of cosmos bipinnatus seeds were added to the flat. The specialty sod was nurtured for 2 months. The specialty sod was harvested and weighed 2845 gms. This sod mat was easily lifted by one end with two hands to demonstrate useful specialty sod mat strength.

The excellent root penetration has reinforced this specialty sod. An identical piece of unused ENNY 0239 was then taped with duct tape on both sides of one end for reinforcement. This taped end was then attached to a wood two by four about 3 feet long by screwing in a piece of lattice over the taped region and into said two by four. This weighed 1200 grams. Attempts to lift the two by four by holding onto the is ENNY 0239 (at the opposite and untaped end) in the same fashion with two hands as the sod was lifted led to repeated and immediate tearing of unused ENNY 0239.

This demonstrates the excellent root entanglement with themselves and the sod mat and the surprising extent of mutual reinforcement in this sample. Propagation conditions and time to harvest affect root penetration and entanglement and thus specialty sod mat strength.

This sod mat was then planted and allowed to grow. After 90 days, we found that the sod mat reinforcement could be easily dispersed in the soil by rototilling or other common means. Still furthermore, after rototilling we found that the roots rotted, thus reversibly destroying the root reinforcement, leaving the remnants of the sod mat reinforcement more dispersible in the soil.

Example 2

Using the sod mat propagation technique illustrated in FIG. 4, a flat was prepared containing about 20 cups of HYPONEX ® ALL PURPOSE POTTING SOIL and using Ergon ENPP 0177 melt blown polypropylene with a basis weight of 0.29 opsy as the nonwoven sod reinforcement. Holes were melted through the nonwoven fabric on a grid of 1 cm by 1 cm and with a diameter of 0.2 cm. Approximately 1.5 gms of cosmos bipinnatus seeds were added to the flat. The specialty sod was nurtured for 2 months. The specialty sod was harvested and weighed 2982 gms. This sod mat had a good root penetration of about 0.1 grams per 400 cm$^2$. The sod mat was easily lifted by one end with two hands to demonstrate useful specialty sod mat strength.

The good root penetration has reinforced this specialty sod. An identical piece of unused ENPP 0177 was then taped with duct tape on both sides of one end for reinforcement. This taped end was then attached to a wood two by four about 3 feet long by screwing in a piece of lattice over the taped region and into said two by four. This weighed 1200 grams. Attempts to lift the two by four by holding onto the ENPP 0177 (at the opposite and untaped end) in the same fashion with two hands as the sod was lifted led to repeated and immediate tearing of unused ENPP 0177.

This demonstrates the excellent root entanglement with themselves and the sod mat and the surprising extent of mutual reinforcement in this sample. Propagation conditions and time to harvest affect root penetration and entanglement and thus specialty sod mat strength.

This sod mat was then planted and allowed to grow. After 90 days, we found that the sod mat reinforcement could be dispersed in the soil by rototilling or other common means. Still furthermore, after rototilling we found that the roots rotted, thus reversibly destroying the root reinforcement, leaving the remnants of the sod mat reinforcement more dispersible in the soil.

Example 3

Using the sod mat propagation technique illustrated in FIG. 4, a flat was prepared containing about 20 cups of HYPONEX ® ALL PURPOSE POTTING SOIL and using Ergon ENPP 0108 melt blown polypropylene with a basis weight of 0.5 opsy as the nonwoven sod reinforcement. This nonwoven sod reinforcement had a series of holes melted completely through the nonwoven on a repeating grid of 2 cm by 2 cm. Diameter of the apertures was 0.3 cm. Approximately 1.5 gms of cosmos bipinnatus seeds were added to the flat. The specialty sod was nurtured for 2 months. This sod mat was easily lifted by one end with two hands to demonstrate useful specialty sod mat strength.

This demonstrates the excellent root entanglement with themselves and the sod mat and excellent handling characteristics of this sod sample. Propagation conditions and time to harvest affect root penetration and entanglement and thus specialty sod mat strength. The holes were very effective in promoting root wetting.

This sod mat was then planted and allowed to grow. After 90 days, we found that the sod mat reinforcement could be dispersed in the soil by rototilling or other common means. Still furthermore, after rototilling we found that the roots rotted, thus reversibly destroying the root reinforcement, leaving the remnants of the sod mat reinforcement more dispersible in the soil.

Example 4

Figure 6:
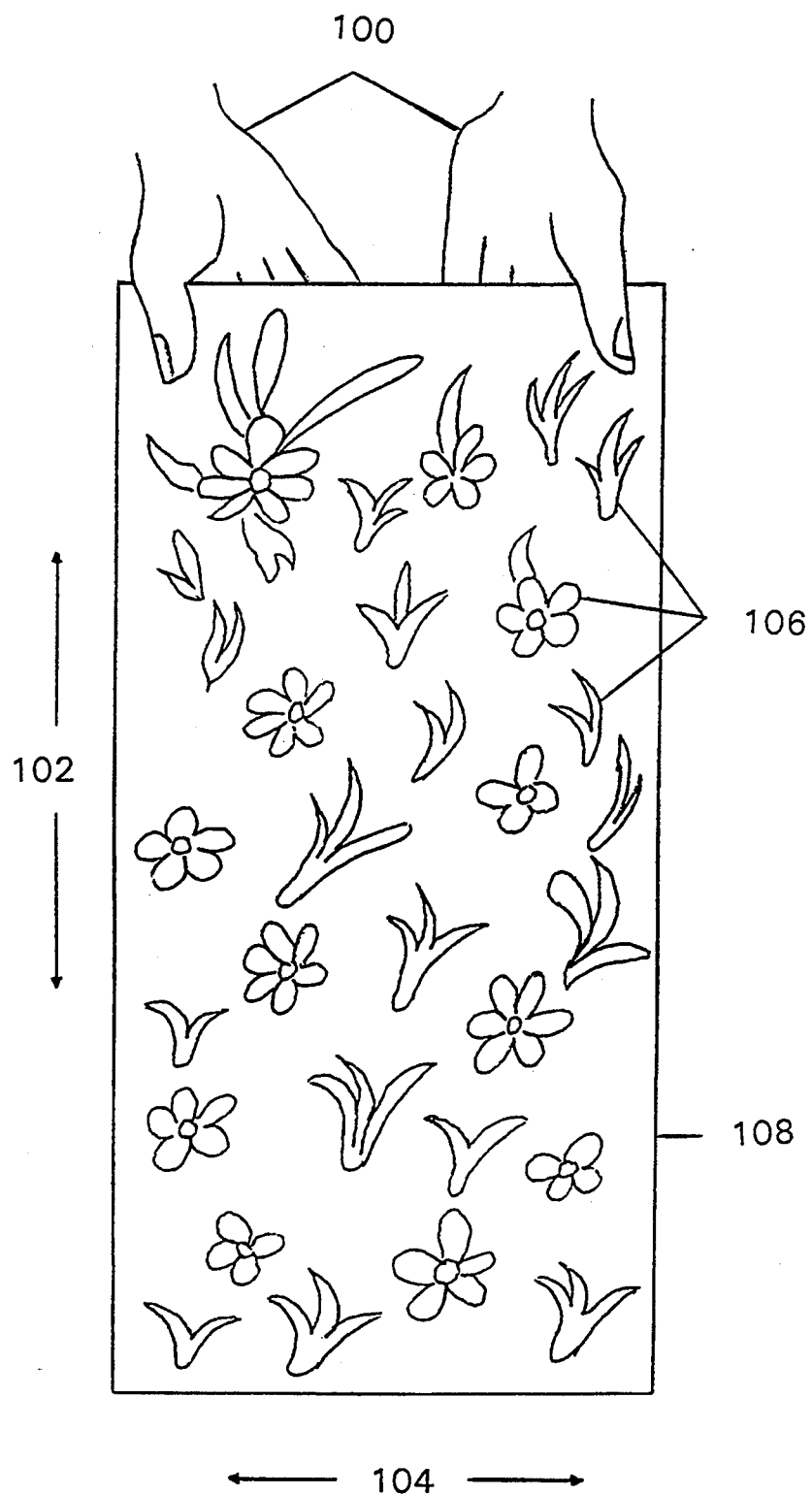
FIG. 6 is an artist's conception of lifting the mature sod mat in Example 4.

Using the sod mat propagation technique illustrated in FIG. 4, a flat was prepared containing about 20 cups of HYPONEX ® ALL PURPOSE POTTING SOIL and using Johnson & Johnson Advanced Materials Co. KIARA ® 4110 spunbond polyester with a basis weight of 0.25 opsy as the nonwoven sod reinforcement. KIARA ® 4110 is anisotropic. The transverse direction (TD) is weak and the machine direction (MD) is stronger. This flat was grown purposefully with the weak direction (TD) in the length direction of the flat. Thus the sod mat would have the lowest reinforcement from the nonwoven sod reinforcement in the length direction of the flat. Approximately 1.5 gms of cosmos bipinnatus seeds were added to the flat. The specialty sod was nurtured for 2 months. The specialty sod was harvested and weighed 2856 gms. This 2856 grams is the Gross Sod Weight (GSW) in grams which can be lifted used in the preceding example calculation of the Mutual Reinforcement Ratio (MRR). This sod mat was easily lifted by one end with two hands to demonstrate useful specialty sod mat strength. FIG. 6 is an artist's sketch of this sod mat being lifted. Reference Numeral 100 represent the two hands lifting the sod mat from the top. Reference Numeral 102 is the transverse direction. Reference Numeral 104 is the machine direction. Reference Numeral 106 represents the mature plants after harvest. Reference Numeral 108 is the mature specialty sod mat.

Figure 7:
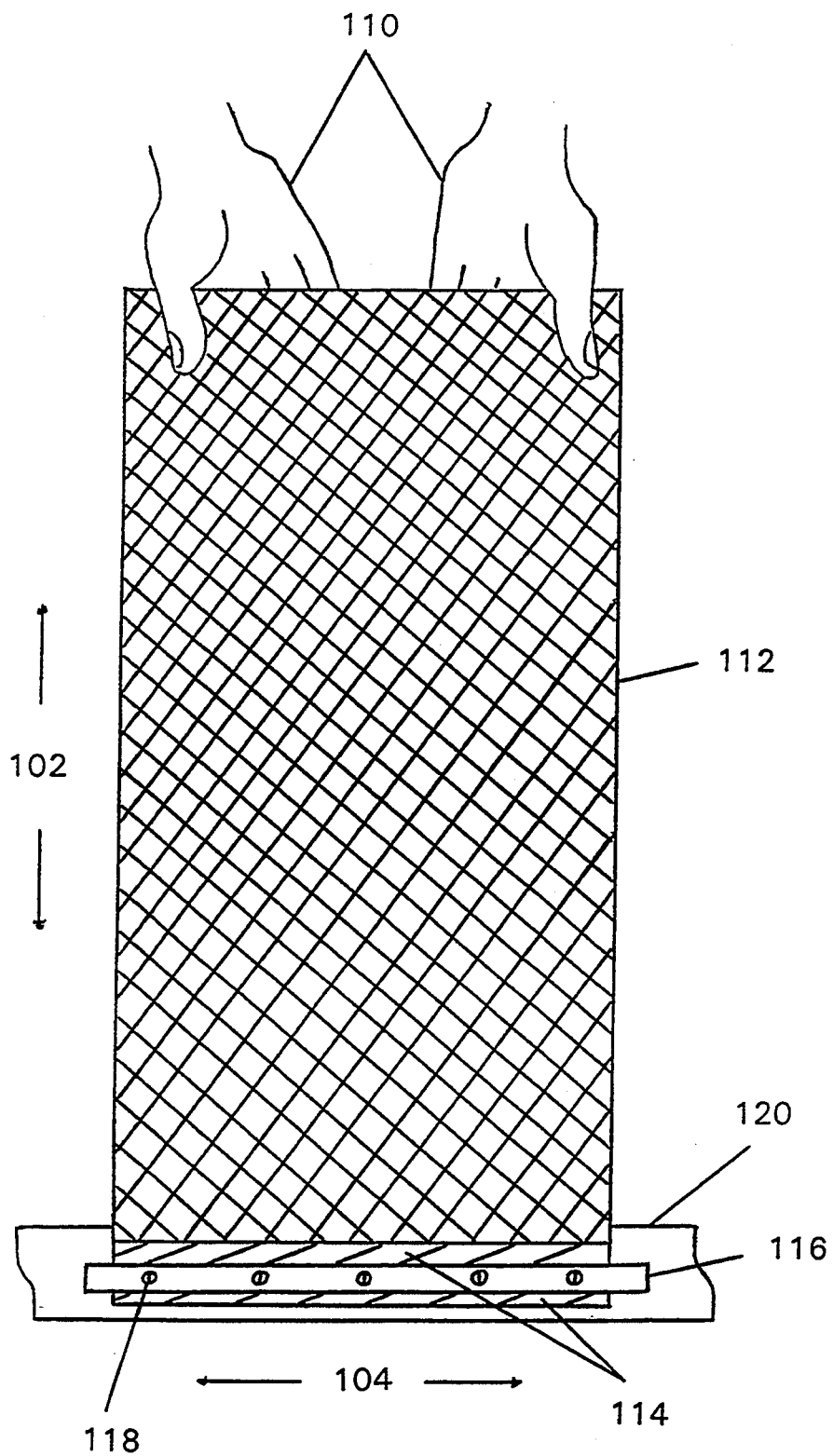
FIG. 7 is an artist's conception of attempting to lift a wooden two by four by the nonwoven sod reinforcement of Example 4.

An identical piece of unused KIARA ® 4110 was then taped with duct tape on both sides of one end for reinforcement (again the TD weak direction is length wise). This taped end was then attached to a piece of wood two by four about 3 feet long by screwing in a piece of lattice over the taped region and into said two by four. This weighed 1200 grams. This 1200 grams is the Tearing Weight of Nonwoven Sod Reinforcement (TW of NSR) in grams used in the preceding example calculation of the Mutual. Reinforcement Ratio. Attempts to lift the two by four by holding onto the KIARA ® 4110 (at the opposite and untaped end) in the same fashion with two hands as the sod was lifted led to repeated and immediate tearing of unused KIARA ® 4110. Further experimentation by those of ordinary skill in the art can be used to determine the lowest Tearing Weight of Nonwoven Sod Reinforcement (TW of NSR) in grams. FIG. 7 is an artist's sketch of the KIARA ® 4110 just before lifting in this manner. Reference Numeral 110 represents the two hands lifting the KIARA ® 4110 from the top. Reference Numeral 102 is the transverse direction. Reference Numeral 104 is the machine direction. Reference Numeral 112 is the KIARA ® 4 110. Reference Numeral 114 is the duct tape which is taped to one end of KIARA ® 4110. Reference Numeral 116 is the lattice which holds the taped end of the KIARA ® 4110 to the two by four with screws. Reference Numeral 118 represents the screws holding the lattice to the two by four. Reference Numeral 120 is the two by four.

This demonstrates the excellent root entanglement with themselves and the sod mat and the surprising extent of mutual reinforcement in this sample. Propagation conditions and time to harvest affect root penetration and entanglement and thus specialty sod mat strength. This example of specialty sod had very good root penetration (0.15 grams per 400 cm² of sod mat). The high porosity KIARA ® 4110 as evidenced from the high air permeability facilitated this good root penetration. The low nonwoven fabric basis weight and low grab tensile strength also aided good root penetration.

This sod mat was then planted and allowed to grow. After 90 days, we found that the sod mat reinforcement could be easily dispersed in the soil by rototilling or other common means. Still furthermore, after rototilling we found that the roots rotted, thus reversibly destroying the root reinforcement, leaving the remnants of the sod mat reinforcement more dispersible in the soil.

Example 5

Using the sod mat propagation technique illustrated in FIG. 4, in a flat containing about 20 cups of HYPONEX® ALL PURPOSE POTTING SOIL and using Johnson & Johnson Advanced Materials Co. KIARA® 4110 spunbond polyester with a basis weight of 0.25 opsy as the nonwoven sod reinforcement. KIARA® 4110 is anisotropic. The transverse direction (TD) is weak and the machine direction (MD) is stronger. This flat was grown purposefully with the strong direction (MD) in the length direction of the flat. Thus, in this case, the sod mat would have the highest reinforcement from the nonwoven sod reinforcement in the length direction of the flat. Approximately 1.5 gms of cosmos bipinnatus seeds were added to the flat. The specialty sod was nurtured for 2 months. This sod mat was easily lifted by one end with two hands to assure useful specialty sod mat strength.

This confirms that KIARA® 4110 makes very good specialty sod mats when oriented in either direction. The toughness and ease of handling again demonstrates the excellent root entanglement with themselves and the sod mat and the surprising extent of mutual reinforcement in this sample. Propagation conditions and time to harvest affect root penetration and entanglement and thus specialty sod mat strength. This example of specialty sod had very good root penetration (0.1 grams per 400 cm² of sod mat). The high porosity KIARA® 4110 as evidenced from the high air permeability facilitated this good root penetration.

This sod mat was then planted and allowed to grow.

Example 6

Using the sod mat propagation technique illustrated in FIG. 4, a flat was prepared containing about 20 cups of TERRA-LITE REDI EARTH® and using Ergon ENPP 0105 melt blown polypropylene with a basis weight of 0.12 opsy as the nonwoven sod reinforcement. Approximately 0.2 gms of plains coreopsis seeds were added to the flat. The specialty sod was nurtured for about 2 months. The specialty sod was harvested. This sod mat was easily lifted and was a useful specialty sod mat. This sod mat also had very good root penetration (0.2 grams per 400 cm² of sod mat) which is believed to be related to the good porosity of this melt blown nonwoven sod reinforcement. The very low nonwoven fabric basis weight and very low grab tensile strength also aided the good root penetration. This demonstrates the importance of good root penetration for good specialty sod mat handling characteristics. Propagation conditions and time to harvest affect root penetration and entanglement and thus specialty sod mat strength.

This sod mat was then planted and allowed to grow. After 90 days, we found that the sod mat reinforcement could be easily dispersed in the soil by rototilling or other common means. Still furthermore, after rototilling we found that the roots rotted, thus reversibly destroying the root reinforcement, leaving the remnants of the sod mat reinforcement more dispersible in the soil. The very low basis weight and very low grab tensile strength aided the dispersal of this nonwoven fabric into the garden soil.

Example 7

A custom Flower Mix A1 was prepared with the following species: A mixture of wildflower seeds was made of achillea millefolium (3%), cheiranthus allioni (5%), chrysanthemum leucanthum (5%), coreopsis lanceoleta (9%), echinacea purpurea (22%), hesperis matronalis (7%), linum perenne lewisii (7%), lychnis chalcedonica (2%), rudbeckia hirta (9%), centaurea cyanus (4%), coreopsis tinctoria (2%), gaillardia pulchella (9%), linum grandiflorum (14%), papaver rhoeas (1%) and silene armeria (1%) was made. Seed percentages are by weight.

Using the sod mat propagation technique illustrated in FIG. 5, a field grown sod mat was propagated using FAIRGROW® and using Fiberweb CELESTRA® 0.5 spunbond polypropylene with a basis weight of 0.5 opsy as the nonwoven sod reinforcement. Flower Mix A1 was used at a seeding rate of about 1–2 lbs per 1000 square feet. The specialty sod was nurtured for about 8 months. The specialty sod was harvested. This sod mat was easily lifted and was a useful specialty sod mat. This sod mat also had very good root penetration (0.2 grams per 400 cm² of sod mat) which is believed to be related to the good porosity of this spunbond nonwoven sod reinforcement. This demonstrates the importance of good root penetration for good specialty sod mat handling characteristics. Propagation conditions and time to harvest affect root penetration and entanglement and thus specialty sod mat strength.

This sod mat was then planted and allowed to grow. After 180 days, we found that the sod mat reinforcement could be dispersed in the soil by rototilling or other common means. Still furthermore, after rototilling we found that the roots rotted, thus reversibly destroying the root reinforcement, leaving the remnants of the sod mat reinforcement more dispersible in the soil.

Example 8

Using the sod mat propagation technique illustrated in FIG. 5, a field grown sod mat was propagated using FAIRGROW® and using Fiberweb CEREX® Type 29 spunbond nonwoven nylon 66 with a basis weight of 0.3 opsy as the nonwoven sod reinforcement. Flower Mix A1 was used at a seeding rate of about 1–2 lbs per 1000 square feet. The specialty sod was nurtured for about 8 months. The specialty sod was harvested. This sod mat was easily lifted and was a useful specialty sod mat. This sod mat also had very good root penetration (0.15 grams per 400 cm²) which is believed to be related to the good porosity of this nonwoven sod reinforcement. This demonstrates the importance of good root penetration for good specialty sod mat handling characteristics. Propagation conditions and time to harvest affect root penetration and entanglement and thus specialty sod mat strength.

This sod mat was then planted and allowed to grow. After 180 days, we found that the sod mat reinforcement could be dispersed in the soil by rolotilling or other common means. Still furthermore, after rototilling we found that the roots rotted, thus reversibly destroying the root reinforcement, leaving the remnants of the sod mat reinforcement more dispersible in the soil.

Example 9

Using the sod mat propagation technique illustrated in FIG. 4, a flat grown sod mat was propagated using FAIRGROW® and using Johnson & Johnson Advanced Materials Co. MASSLINN® 5167 hydroentangled nonwoven fabric which is a blend of 50/50 rayon/polyester and has a basis weight of 0.6 opsy. The machine direction grab tensile strength is nominally 9.5 lb and the transverse direction grab tensile strength is nominally 1.2 lb in unused state. Flower Mix A1 was used at a seeding rate of about 1-2 lbs per 1000 square feet. The specialty sod was nurtured for about 8 months. A useful specialty sod mat was harvested. The sod mat had good root penetration and good handling characteristics. Propagation conditions and time to harvest affect root penetration and entanglement and thus specialty sod mat strength.

This sod mat was then planted and allowed to grow. After 180 days, we found that the sod mat reinforcement could be dispersed in the soil by rototilling or other common means. Still furthermore, after rototilling we found that the roots rotted, thus reversibly destroying the root reinforcement, leaving the remnants of the sod mat reinforcement more dispersible in the soil.

Example 10

Using the sod mat propagation technique illustrated in FIG. 4, a flat grown sod mat was propagated using FAIRGROW ® and using a carded lightly entangled nonwoven web comprising staple polyester fibers of about 1 dtex and a web basis weight of about 1 opsy. The nonwoven web was estimated to have a machine direction grab tensile strength of greater than about 2 lb and a transverse direction grab tensile strength was estimated to be less than 0.1 lb in the unused state. Approximately 1.5 gms of cosmos bipinnatus seeds were added to the flat. A useful specialty sod mat was harvested in 60 days. The sod mat had good root penetration and good handling characteristics. Propagation conditions and time to harvest affect root penetration and entanglement and thus specialty sod mat strength.

Example 11

Using the sod mat propagation technique illustrated in FIG. 4, a flat grown sod mat was propagated using a 50/50 volume mixture of FAIRGROW ® and ordinary soil and using Fiberweb CEREX ® Type 29 spunbond nonwoven nylon 66 with a basis weight of 0.3 opsy as the nonwoven sod reinforcement. Plugs of sweet woodruff were planted on a grid of 6 cm by 6 cm. The specialty sod was nurtured for about 12 months. The specialty sod was harvested. This sod mat was easily lifted and was a useful specialty sod mat.

This sod mat was then planted and allowed to grow. After 180 days, we found that the sod mat reinforcement could be dispersed in the soil by rototilling or other common means.

Comparative Example 12

Using the sod mat propagation technique of illustrated in FIG. 4, a flat was prepared containing about 20 cups of HYPONEX ® ALL PURPOSE POTTING SOIL and using no nonwoven sod reinforcement. Approximately 1.5 gms of cosmos bipinnatus seeds were added to the flat. The sod mat was nurtured for 2 months. Attempts were made to harvest a sod mat. The "sod mat" repeatedly broke. This sod mat could not lifted by one end with two hands.

This comparative example demonstrates the commercial value of the root penetration and entanglement with nonwoven sod reinforcement to form a sod mat with good sod mat production and handling characteristics. In Comparative Example 12 no "sod mat" was formed with useful integrity, while in Example 4 a sod mat with good handling characteristics was formed with a good Mutual Reinforcement Ratio using a very low strength nonwoven sod reinforcement.

Summary, Ramifications, and Scope

Accordingly, one of ordinary skill in the art will see that valuable specialty sod mats can be easily propagated according to this invention which have very good sod mat propagation characteristics, are easy to handle, have good "shelf life ", and which may be rototilled or otherwise dispersed in the soil after their usefulness is over. This unique combination of specialty sod mat characteristics are especially important to discerning retail customers. They also aid the grower to economically propagate these specialty sods. With proper handling, the landscaper can install specialty sods for the discerning customer. Specialty sod mats of grasses, nutritional plants and ornamental plants are easily and economically grown with this process. Flower sod mats are often harvested and sold in bloom. These sods have excellent root development and contain viable growing plants. The root structure remains intact during harvesting and, in general, these specialty sod mats are easily divisible by hand with minimum root tearing to enhance plant coverage and facilitate ease of installation. These specialty sod mats have good root entanglement which reinforces them during handling and installation, but upon rototilling into the soil after their usefulness is over the roots rot, further facilitating dispersal of the sod mats in the soil.

Although the specification and examples show many preferred embodiments, these are not to be construed as limiting the scope of the invention in anyway but merely as providing illustrations of some of the presently preferred embodiments of this invention. Various known techniques may be combined with this invention such as automating the production of these sod mats for greenhouses, cooling the sod mats for storage or shipping purposes, and modifying the propagation field so all irrigation water may be collected and recycled. Planting medium treatment agents can effectively be incorporated into the nonwoven sod reinforcements to further simplify and/or improve propagation of specialty plant sod mats. Illustrative examples of planting medium treatment agents include moisture absorbers, nutrients and plant growth regulators helpful to propagation. U.S. Pat. No. 5,139,566 to Zimmerman is a representative example of this technology known to those skilled in the art and is included by reference herein.

We claim:

1. A new and improved plant sod mat comprising the following:
    a) a nonwoven sod reinforcement wherein said nonwoven sod reinforcement is a nonwoven fabric with a grab tensile strength of less than or equal to about 5.5 lb and said nonwoven fabric has an Effective Fiber Count from about 30 to 10000 per square centimeter and;
    b) a layer of planting medium on said nonwoven sod reinforcement and;
    c) viable plants growing in said planting medium and whose roots penetrate and entangle with said nonwoven fabric and thus, form a sod mat wherein said root penetration through said nonwoven fabric is greater than or equal to about 0.05 grams per 400 $cm^2$ of said sod mat.

2. A new and improved sod mat of claim 1 wherein said grab tensile strength is less than or equal to about 4 lb.

3. A new and improved sod mat of claim 2 wherein said sod mat has a Mutual Reinforcement Ratio of greater than about 2.

4. A new and improved sod mat of claim 1 wherein said sod mat has a Mutual Reinforcement Ratio of greater than about 1.5 and said nonwoven fabric is comprised of polyolefin fibers.

5. A new and improved sod mat of claim 1 wherein said nonwoven fabric has a basis weight of less than or equal to about 0.4 opsy.

6. A new and improved plant sod mat comprising the following:
   a) a synthetic reinforcement wherein said synthetic reinforcement consists essentially of a nonwoven fabric with an average grab tensile strength of less than or equal to 5.5 lb and said nonwoven fabric has an Effective Fiber Count from about 50 to 10000 per square centimeter and;
   b) a layer of planting medium on said nonwoven sod reinforcement and;
   c) viable garden plants growing in said planting medium and whose roots penetrate and entangle with said nonwoven fabric and thus, form a sod mat wherein said root penetration through said nonwoven fabric is greater than or equal to about 0.05 grams per 400 cm$^2$ of said sod mat.

7. A new and improved sod mat of claim 6 wherein said nonwoven fabric is an entangled nonwoven fabric.

8. A new and improved sod mat of claim 6 wherein said sod mat has a Mutual Reinforcement Ratio of greater than about 2.

9. A new and improved sod mat of claim 6 wherein said nonwoven fabric is comprised of polyester fibers.

10. A new and improved sod mat of claim 9 wherein said sod mat has a Mutual Reinforcement Ratio of greater than or equal to about 2.

11. A new and improved sod mat of claim 9 wherein said nonwoven fabric has a basis weight of less than or equal to 0.4 opsy.

12. A new and improved sod mat of claim 6 wherein said average grab tensile strength is less than about 4 lb.

13. A new and improved sod mat of claim 12 wherein said sod mat has a Mutual Reinforcement Ratio of greater than or equal to about 2.

14. A new and improved sod mat of claim 6 wherein said nonwoven fabric comprises fibers from about 0.1 dtex to 3 dtex.

15. A new and improved sod mat of claim 6 wherein said nonwoven fabric has a hydrohead of less than about 40 cm and said Effective Fiber Count is from about 100 to 5000 per square centimeter of nonwoven fabric and said nonwoven fabric is comprised of fibers selected from the group of fibers consisting of nylon and polyolefin chemistry.

16. A new and improved sod mat of claim 15 wherein said sod mat has a Mutual Reinforcement Ratio of greater than about 1.5 and said garden plants comprise ornamental plants.

17. A new and improved sod mat of claim 15 wherein said average grab tensile strength is from about 0.1 lb to 4 lb.

18. A new and improved sod mat of claim 15 wherein said nonwoven fabric has a basis weight of less than or equal to about 0.4 opsy.

19. A new and improved plant sod mat comprising the following:
   a) a garden plant sod mat reinforced with an effective synthetic reinforcement wherein said synthetic reinforcement consists essentially of a nonwoven fabric with an average grab tensile strength of less than or equal to about 5.5 lb and said nonwoven fabric has an Effective Fiber Count of from 30 to 10000 per square centimeter and said nonwoven fabric is comprised of fibers selected from the group of fibers consisting of nylon and polyolefin chemistry;
   b) and plant roots which penetrate and entangle with said nonwoven fabric and planting medium to form a sod mat wherein said garden plant root penetration is greater than 0.05 grams per 400 cm$^2$ of said sod mat.

20. A new and improved sod mat of claim 19 wherein said sod mat has a Mutual Reinforcement Ratio of greater than or equal to about 1.5.

21. A new and improved sod mat of claim 19 wherein said average grab tensile strength is less than or equal to about 4 lb.

22. A new and improved sod mat of claim 21 wherein said sod mat has a Mutual Reinforcement Ratio greater than or equal to about 2.

23. A new and improved sod mat of claim 21 wherein said Effective Fiber Count is from about 100 to 5000 per square centimeter of nonwoven fabric and said root penetration is greater than or equal to about 0.1 grams per 400 cm$^2$ of said sod mat and said nonwoven fabric has a basis weight of less than about 0.4 opsy.

24. A new and improved sod mat of claim 19 wherein said average grab tensile strength is less than or equal to about 2 lb.

25. A new and improved sod mat of claim 24 wherein said sod mat has a Mutual Reinforcement Ratio greater than or equal to about 2.

26. A new and improved sod mat of claim 1 wherein said nonwoven fabric has an average tensile strength of from 5.5 to 0.1 lbs when tested after a 180 day soil burial test ASTM D-2020.

27. A new and improved sod mat of claim 6 wherein said nonwoven fabric has an average tensile strength of from 4 to 0.1 lbs when tested after a 180 day soil burial test ASTM D-2020.

28. A new and improved sod mat of claim 12 wherein said nonwoven fabric has an average tensile strength of from 4 to 0.1 lbs when tested after a 180 day soil burial test ASTM D-2020.

29. A new and improved sod mat of claim 1 wherein said nonwoven fabric is anisotropic.

30. A new and improved sod mat of claim 8 wherein said nonwoven fabric is anisotropic.

31. An improved method of propagating plant sod mat comprising:
   a. Preparing sod growing surface;
   b. placing a synthetic reinforcement on said growing surface wherein said synthetic reinforcement consists essentially of a nonwoven fabric with a grab tensile strength of less than or equal to 5.5 lb and said nonwoven fabric has an Effective Fiber Count from about 50 to 10000 per square centimeter;
   c. placing a layer of planting medium on said synthetic reinforcement;
   d. placing viable plant starting material in contact with said planting medium;

e. watering and nourishing said plant starting material for growth to establish a root penetration of greater than or equal to about 0.05 grams per 400 cm² thus forming a sod mat.

32. An improved method of propagating plant sod mats of claim 31 wherein said watering and nourishing step develops sufficient root penetration and entanglement with said synthetic reinforcement to create a MRR of greater than about 1.5 and wherein said plant starting material comprises garden plant starting material.

33. An improved method of propagating plant sod mats of claim 31 wherein said watering and nourishing step develops sufficient root penetration and entanglement with said synthetic reinforcement to create a MRR of greater than about 2 and wherein said plant starting material comprises ornamental plant starting material and wherein said grab tensile strength is less than 4 lb.

34. A new and improved sod mat grown according to claim 33.

35. An improved method of propagating plant sod mats of claim 31 wherein said watering and nourishing step develops sufficient root penetration and entanglement with said synthetic reinforcement to reinforce said sod mat.

* * * * *